United States Patent [19]

Araki et al.

[11] Patent Number: 4,941,814
[45] Date of Patent: Jul. 17, 1990

[54] VACUUM FORMING APPARATUS

[75] Inventors: Kazui Araki, Ora; Yoshio Kobayashi, Ota; Seiji Matsumoto, Ota; Hisao Fukushima, Ota, all of Japan

[73] Assignee: Shigeru Kogyo Kabushiki Kaisha, Japan

[21] Appl. No.: 313,085

[22] Filed: Feb. 21, 1989

Related U.S. Application Data

[62] Division of Ser. No. 72,701, Jul. 13, 1987, Pat. No. 4,847,034.

[51] Int. Cl.$^5$ ............................................. B29C 51/10
[52] U.S. Cl. .................................... 425/388; 425/394; 425/403
[58] Field of Search ...................... 156/212, 285, 287; 264/292, 516, 550, 553, 554; 425/383, 388, 394, 397, 398, 403, 423

[56] References Cited

U.S. PATENT DOCUMENTS 4,480,979 11/1984 Keith et al. ......................... 264/550

FOREIGN PATENT DOCUMENTS 192529 10/1984 Japan.

OTHER PUBLICATIONS

Plastic Processing Technical Handbook, Kenji Okubo, 7-10-84, pp. 435-443.

Primary Examiner—Jay H. Woo
Assistant Examiner—Timothy W. Heitbrink
Attorney, Agent, or Firm—Kane, Dalsimer, Sullivan, Kurucz, Levy, Eisele and Richard

[57] ABSTRACT

Vacuum forming apparatus in which a thermoplastic sheet material is pushed, by at least one plug, into a recess formed in a female mold, and evacuation is applied to the recess to bring the sheet material into intimate contact with a wall surface of the recess. At least one of the female mold and the plug is moved in a first direction in which the plug and a bottom of the recess relatively move toward each other. At least one of the female mold and the plug is moved in a second direction substantially perpendicular to the first direction, in which second direction the plug and a peripheral edge of the recess relatively move toward each other.

9 Claims, 7 Drawing Sheets

VACUUM FORMING APPARATUS

This is a divisional of co-pending application serial no. 072,701 filed on Jul. 13, 1987 now U.S. Pat. No. 4847034.

BACKGROUND OF THE INVENTION

The present invention relates to a vacuum forming method and apparatus in which a thermoplastic sheet material to be formed is pushed, by at least one plug, into a recess provided in a female mold.

Various kinds of vacuum-forming methods are conventionally known from, for example, Japanese Patent Laid-Open Application No. 59-192529, in which a thermoplastic sheet material is drawn under vacuum so as to be brought into intimate contact with a wall surface of a recess formed in a female mold, to thereby form the sheet material. In recent years, a plug-assist forming method has largely been utilized for the advantageous reason that deep-drawing is possible, and in view of other advantages. FIGS. 1(A) through 1(C) of the accompanying drawings illustrate an example of a vacuum-forming apparatus for carrying the plug-assist forming method into effect. In this connection, reference should be made to "Plastic Kako Gijutsu Binran (Plastic Processing Technical Handbook)" written by Kenji Okubo and published by Nikkan Kogyo Shimbun-sha on Jul. 10, 1984, pp. 435–443. As illustrated in FIG. 1(A), a female mold 1 has formed therein a recess 1a which opens to an upper surface of the female mold 1. The recess 1a is adapted to communicate with evacuation means, not shown, through communication bores 1b and a pipe 2. The reference numeral 3 designates a plug for pushing a thermoplastic sheet material 4 into the recess 1a. The plug 3 is substantially analogous in configuration to the recess 1a.

In forming the sheet material 4 by the vacuum forming apparatus constructed as described above, the sheet material 4 is first arranged above the female mold 1 and is heated by a heater, not shown, to soften the sheet material 4. The plug 3 is then moved to a predetermined position within the recess 1a to push the sheet material 4 thereinto, as shown in FIG. 1(B). Subsequently, a substantially closed space defined by the recess 1a and the sheet material is evacuated to bring the sheet material 4 into intimate contact with the wall surface of the recess 1a, as shown in FIG. 1(C). The sheet material 4 is then cooled and cured.

It is possible for the above-described plug-assist forming method to draw the sheet material deeper than a straight forming method in which a sheet material is merely drawn under vacuum so as to be brought into intimate contact with a wall surface of a recess without use of a plug. However, the plug-assist forming method has a certain limit in the deep-drawing, and cannot be said sufficiently satisfactory.

Specifically, as indicated by the two-dot-and-dash lines in FIG. 1(A), as the plug 3 moves toward the recess 1a, the plug 3 is brought into contact with the sheet material 4 to urge the same, and brings the sheet material 4 into contact with the female mold 1. As a result, the sheet material 4 is restrained at a point A by the female mold 1 and at a point B by the plug 3. As the plug 3 further moves downwardly, an extremely narrow portion of the sheet material 4 between the points A and B is largely stretched. Thus, a portion of a formed product corresponding to the portion of the sheet material 4 between the points A and B becomes thinner than the remaining portion. For this reason, it is not possible for the conventional plug-assist forming method to obtain a sufficiently satisfied drawing depth. Furthermore, if the peripheral wall surface of the recess 1a extends vertically, a gap between the peripheral wall surface of the recess 1a and the peripheral surface of the plug 3 cannot help but be narrowed inevitably, so that the above-mentioned problem becomes more and more marked. Thus, it becomes difficult per se to carry the plug-assist forming method into effect.

OBJECT AND SUMMARY OF THE INVENTION

It is an object of the invention to provide a vacuum forming method and apparatus which enable a drawing deeper than the conventional vacuum forming method and apparatus and, yet further, enable the forming even if a wall surface of a recess formed in the female mold extends substantially parallel to a direction in which a bottom of the recess and at least one plug relatively move toward each other.

According to the invention, there is provided a vacuum forming method comprising the steps of:

preparing a female mold having formed therein a recess and plug means arranged in facing relation to an opening of the recess;

bringing a sheet material to be formed, to a position between the plug means and the female mold;

heating the sheet material to soften the same;

moving at least one of the plug means and the female mold in a first direction in which the plug means and a bottom of the recess relatively move toward each other, to cause the plug means to urge the sheet material toward the bottom of the recess while stretching the sheet material;

moving at least one of the plug means and the female mold in a second direction substantially perpendicular to the first direction, in which second direction the plug means and a peripheral edge of the recess relatively move toward each other, to cause the plug means to urge the sheet material toward the peripheral edge of the recess while stretching the sheet material;

evacuating a substantially closed space defined by the recess and the sheet material, to bring the sheet material into intimate contact with a wall surface of the recess; and cooling the sheet material while maintaining in contact with the wall surface of the recess, to cure the sheet material.

According to the invention, there is further provided a vacuum forming apparatus comprising:

a female mold having formed therein a recess;

plug means arranged in facing relation to an opening of the recess;

first moving means for moving at least one of the female mold and the plug means in a first direction in which the plug means and a bottom of the recess relatively move toward each other, to cause the plug means to urge a sheet material toward the bottom of the recess while stretching the sheet material;

second moving means for moving at least one of the female mold and the plug means in a second direction substantially perpendicular to the first direction, in which second direction the plug means and a peripheral edge of the recess relatively move toward each other, to cause the plug means to urge the sheet material toward the peripheral edge of the recess while stretching the sheet material; and means for evacuating a substantially closed space defined by the recess and the sheet material, to bring the sheet material into intimate contact with a wall surface of the recess.

DETAILED DESCRIPTION

The invention will now be described in detail with reference to FIGS. 2 through 7 of the accompanying drawings.

Figure 1A:
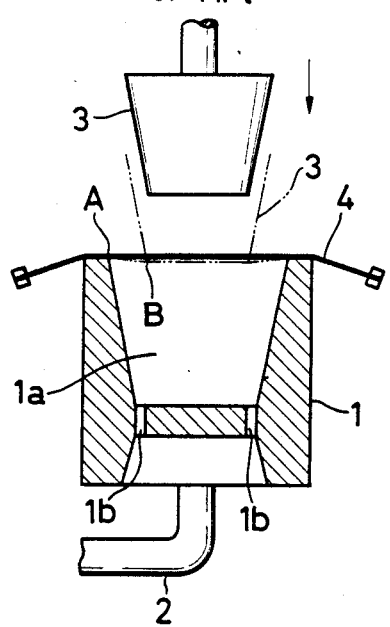
FIGS. 1(A) through 1(C) are schematic cross-sectional views for explanation of arrangement and operation of the conventional vacuum forming method and apparatus.
Figure 1B:
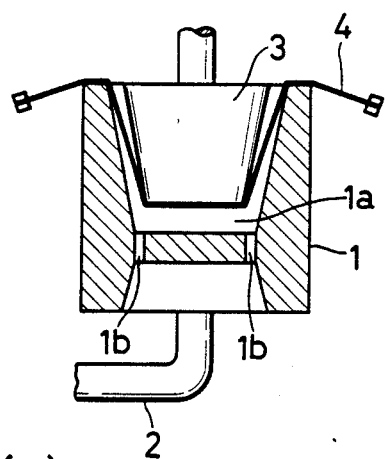
Figure 1C:
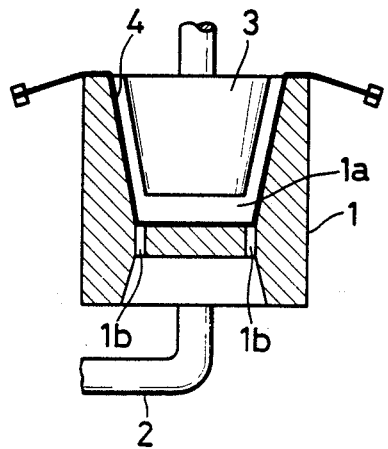
Figure 2A:
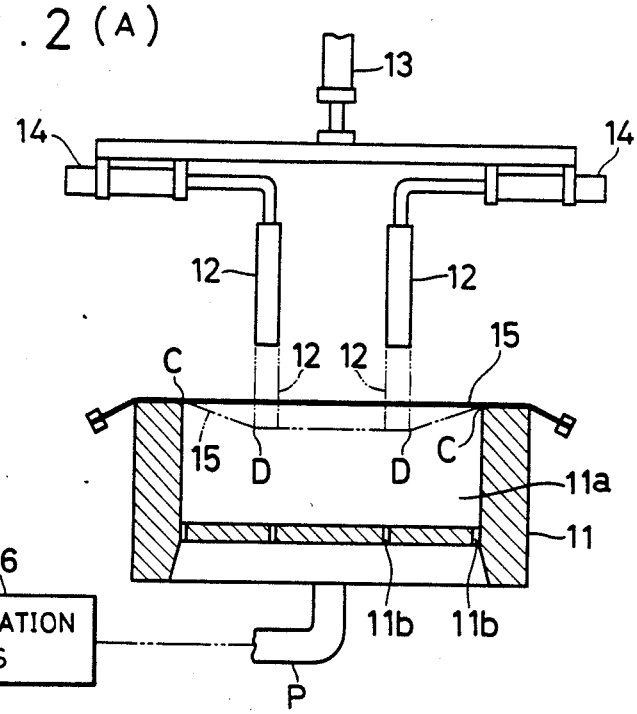
FIGS. 2(A) through 2(C) are schematic cross-sectional views for explanation of arrangement and operation of the present invention.
Figure 2B:
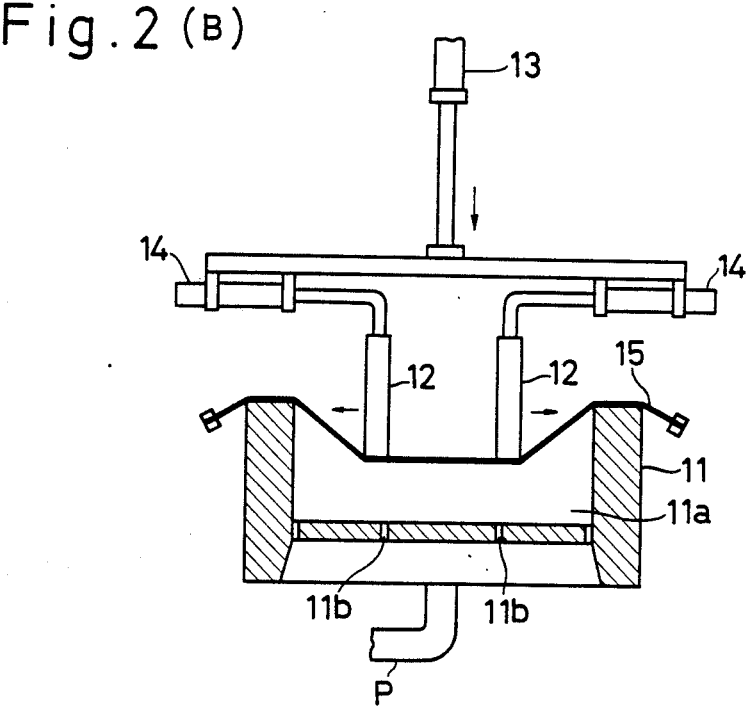
Figure 2C:
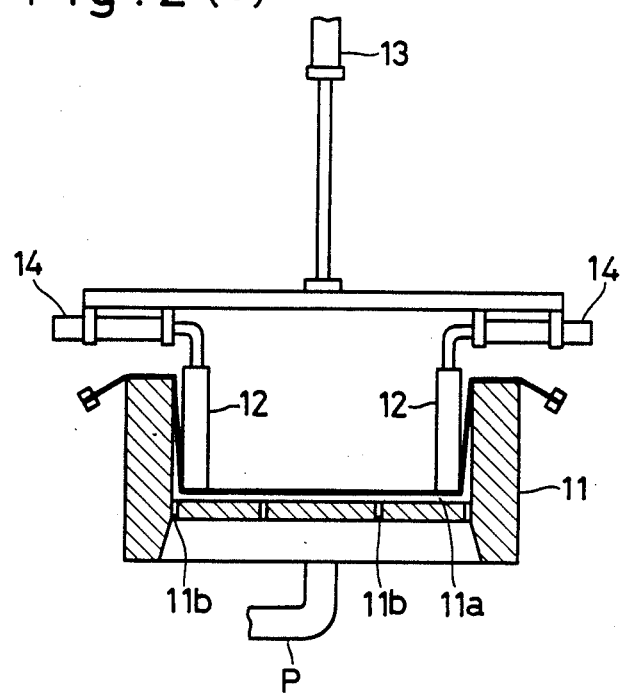

Referring first to FIGS. 2(A) through 2(C), there is illustrated a vacuum forming apparatus according to the invention, which comprises a female mold 11 and a pair of plugs 12. The female mold 11 has formed therein a recess 11a which opens to an upper surface of the female mold 11. A plurality of bores 11b are formed through a bottom wall of the recess 11a. The recess 11a is connectable to evacuation means 16 such as, for example, a vacuum tank through the bores 11b and a pipe P. The female mold 11 is formed integrally as a whole, and the recess 11a has a rectangular cross-section in a vertical plane. However, the present invention should not be limited to this specific structure and configuration, but is applicable to any other structures and configurations, if they are utilizable in a vacuum forming method.

A cylinder 13 serving as first moving means is associated with the pair of plugs 12 for moving the same in a first direction, i.e., toward the bottom of the recess 11a. Cylinders 14 serving as second moving means are associated respectively with the pair of plugs 12 for respectively moving the same in a second direction substantially perpendicular to the first direction, i.e., toward the peripheral edge of the recess 11a. The first and second moving means are arranged such that the plugs 12 are first moved in the first direction by the first moving means until the sheet material 15 is urged by the plugs 12 toward the bottom of the recess 11a through a predetermined distance, and the plugs 12 are then moved both in the first and second directions by the first and second moving means. The first moving means may be associated with the female mold 11 to move the same in the first direction. Alternatively, the first moving means may be associated with both the plugs 12 and the female mold 11 to move them in the first direction.

Figure 3:
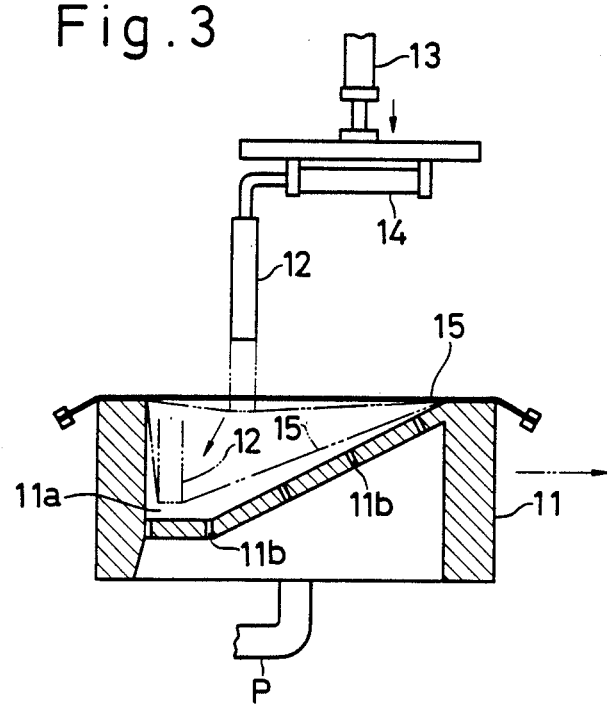
FIG. 3 is a schematic cross-sectional view for explanation of arrangement and operation of another form of the present invention.

FIG. 3 shows another form of the present invention, in which only one plug 12 is employed. In FIG. 3, like reference numerals are used to designate parts or components like or similar to those illustrated in FIGS. 2(A) through 2(C). The recess 11a shown in FIG. 3 is defined by a planar bottom wall surface, three vertical side wall surfaces and the remaining one inclined side wall surface. The cylinder 13 serving as the first moving means is associated with the plug 12 for moving the same in the first direction, i.e., toward the bottom of the recess 11a. The cylinder 14 serving as the second moving means is associated with the plug 12 for moving the same in the second direction, i.e., toward the peripheral edge of the recess 11a. The first and second moving means are arranged such that the plug 12 is first moved in the first direction by the first moving means until the sheet material 15 is urged by the plug 12 toward the bottom of the recess 11a through a predetermined distance, and the plug 12 is then moved both in the first and second directions by the first and second moving means In the arrangement of FIG. 3, the first moving means may be associated with the female mold 11 to move the same in the first direction that the bottom of the recess 11a moves toward the plug 12. Alternatively, the first moving means may be associated with both the plug 12 and the female mold 11 for moving them in the first direction. Moreover, the second moving means may be associated with the female mold 11 to move the same in the second direction that the peripheral edge of the recess 11a moves toward the plug 12, as indicated by the two-dot-and-dash arrow. It is of course that the second moving means may be associated with both the plug 12 and the female mold 11 for moving them in the second direction.

Although the cylinders 13 and 14 are employed respectively as the first and second moving means, it is needless to say that other various mechanisms may be utilized as the first and second moving means. Further, it is desirable that the cross-sectional configuration of the plug or plugs 12 in a plane perpendicular to the direction of the movement by the cylinder 14 is analogous to that of the recess 11a in the same plane.

A vacuum forming method according to the invention will next be described. The vacuum forming method of the invention is characterized by first moving the plug or plugs 12 in the first direction in which the plug or plugs 12 moves/move toward the bottom of the recess 11a, to cause the plug or plugs 12 to urge the sheet material 15 toward the bottom of the recess 11a through a predetermined distance while stretching the sheet material, and then moving the plug or plugs 12 both in the first direction and in the second direction substantially perpendicular to the first direction, in which second direction the plug or plugs 12 moves/move toward the peripheral edge of the recess 11a, to cause the plug or plugs 12 to urge the sheet material 15 toward the peripheral edge of the recess 11a while stretching the sheet material It is needless to say that the female mold 11 may first be moved in the first direction until the sheet material 15 is urged toward the bottom of the recess 11a by the plug or plugs 12 through the predetermined distance, and then the plug or plugs 12 may be moved in the second direction while the female mold 11 continues to move in the first direction. Moreover, in the arrangement of FIG. 3, after the plug 12 is brought into contact with the sheet material 15, at least one of the plug 12 and the female mold 11 may be moved in the second direction while the plug 12 continues to move in the first direction. The first direction may be vertical or horizontal.

Since the plug or plugs 12 can move, relatively to the female mold 11, not only in the first direction but also in the second direction, it is made possible, as compared with the conventional vacuum forming method and apparatus, to increase a distance between a point C at which the sheet material 15 is restrained by the female mold 11 and a point D at which the sheet material 15 is restrained by the plug 12. Thus, it is possible to avoid that the sheet material is partially or locally thinned excessively.

Figure 4:
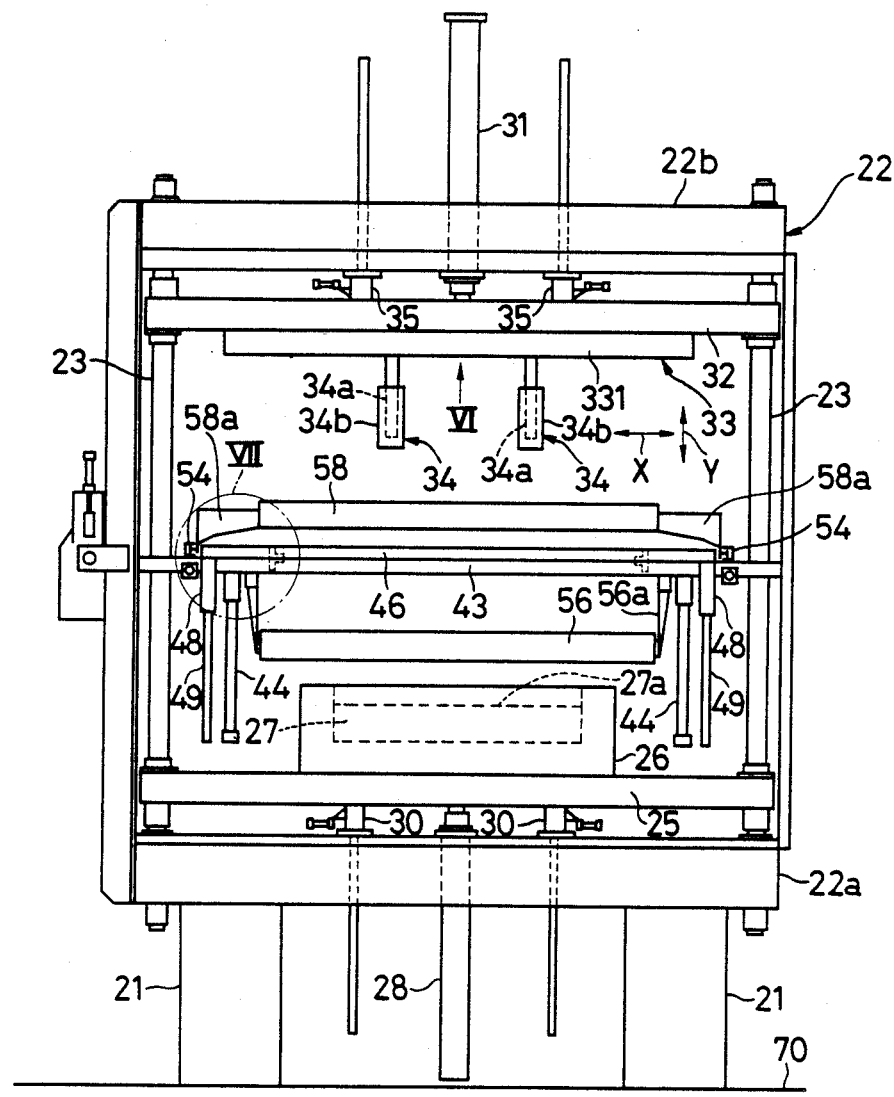
FIG. 4 is a front elevational view showing a vacuum forming apparatus according to an embodiment of the invention.
Figure 5:
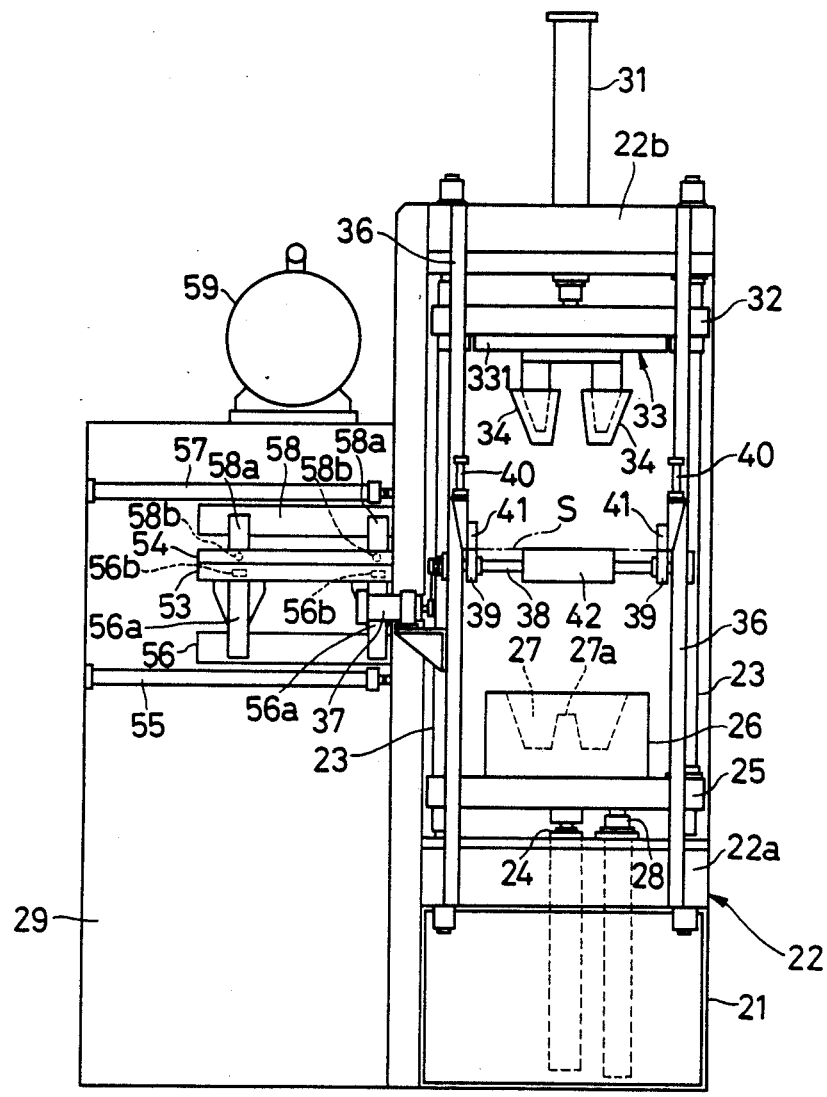
FIG. 5 is a side elevational view showing the apparatus illustrated in FIG. 4.

A specific embodiment of the invention will now be described with reference to FIGS. 4 through 7. FIG. 4 is a front elevational view of a vacuum forming apparatus according to the embodiment of the invention, and FIG. 5 is a side elevational view of the apparatus.

The vacuum forming apparatus comprises base stands 21 resting on a floor surface 70, and an apparatus body 22 fixedly mounted on the base stands 21. The apparatus body 22 includes a base plate 22a fixedly secured to the base stands 21, a top plate 22b located above the base plate 22a in facing relation thereto, and posts, not shown, extending vertically between the base and top plates 22a and 22b to support the latter. Two pairs of guide posts 23 extend vertically between the base and top plates 22a and 22b.

A lower table 25 is slidably mounted on lower portions of the respective posts 23 and can be moved by a cylinder 24 (FIG. 5) mounted on the base plate 22a, along the posts 23 toward and away from the top plate 22b or a first direction Y. The cylinder 24 serves as first moving means. A female mold 26 is fixedly mounted on an upper surface of the lower table 25. An elongated forming recess 27 is provided in the female mold 26 so as to open to an upper surface thereof. A central projection 27a is formed in the recess 27 and extends longitudinally thereof, i.e., in a second direction X perpendicular to the first direction Y, as clearly seen from FIG. 5. The recess 27 is connectable to a vacuum tank 29 (FIG. 5) serving as evacuation means, through a vacuum guide 28 and a flexible tube, not shown. Suitable means 30 are provided for preventing the lower table 25 from falling unintentionally.

An upper table 32 is slidably mounted on upper portions of the respective guide posts 23 and can be moved therealong by a cylinder 31 which is mounted to the top plate 22b and which serves also as the first moving means. First and second pairs of plugs 34 and 34 are mounted on a lower surface of the upper table 32 and can be moved in the second direction X by a moving mechanism 33 serving as second moving means subsequently to be described. Each of the plugs 34 comprises a plate-like core member 34a such as, for example, iron plate having an appropriate strength, and a protective layer 34b formed of a soft material such as foamed plastics or the like with which the core member 34a is covered. Each of the plugs 34 has its cross-sectional configuration in a plane extending in the first direction Y perpendicular to the second direction X, which is substantially identical with a cross-sectional configuration of a corresponding one of two recess portions of the recess 27 defined between the projection 27a and longitudinal side wall surfaces of the recess 27, as clearly seen from FIG. 5. Suitable means 35 are provided for preventing the upper table 32 from falling unintentionally.

Figure 6:
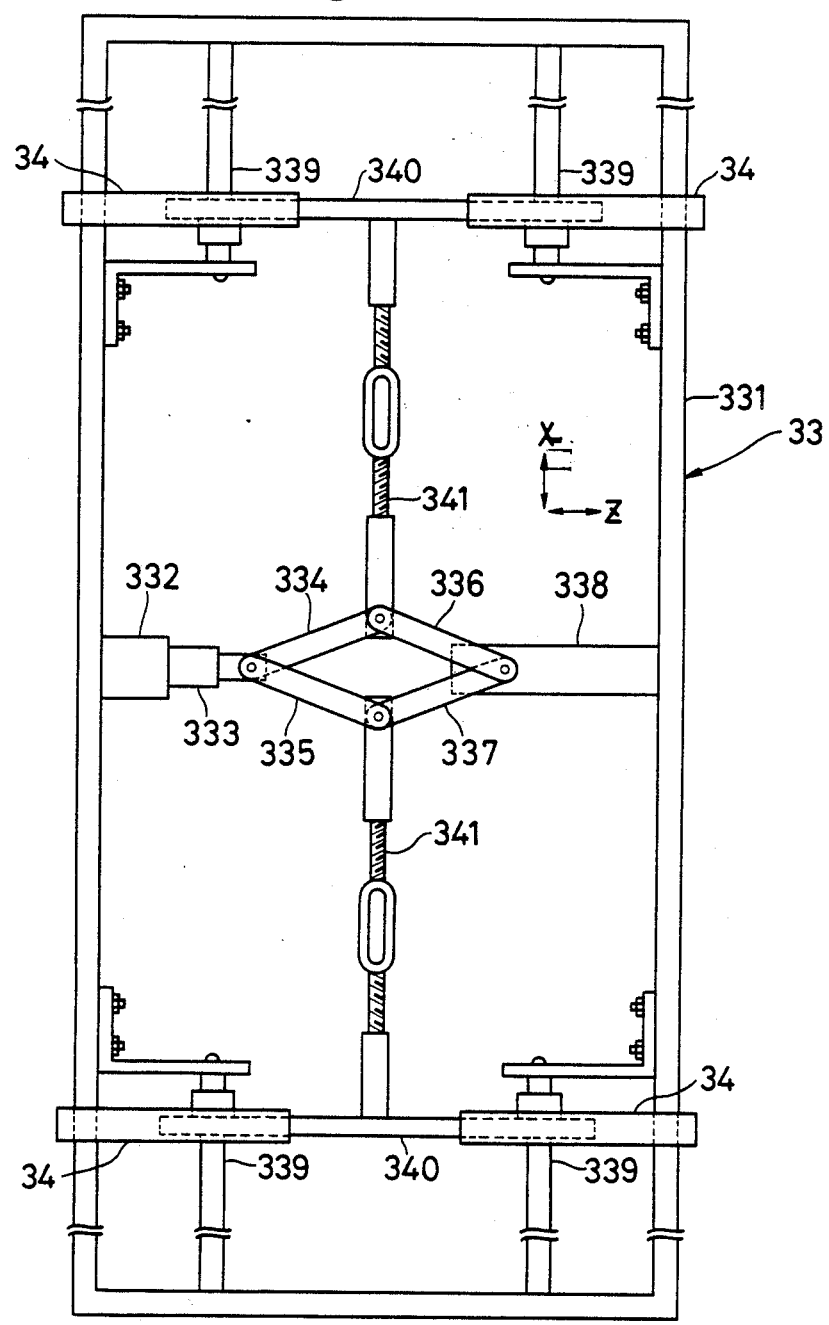
FIG. 6 is a plan view of a moving mechanism of the apparatus, as viewed from the direction VI in FIG. 4.

The above-described moving mechanism 33 is constructed as illustrated in FIG. 6. Specifically, the moving mechanism 33 comprises a rectangular support frame 331 fixedly secured to the lower surface of the upper table 32. A drive shaft 333 capable of being reciprocated in a third direction Z perpendicular to the first and second directions Y and X, by a drive source 332 such as a pulse motor or the like is mounted on one of the opposite sides of the support frame 331 extending in the second direction X. The drive shaft 333 has its front end which is pivotally connected to one ends of respective links 334 and 335. The other ends of the respective links 334 and 335 are pivotally connected respectively to one ends of respective links 336 and 337. The other ends of the respective links 336 and 337 are pivotally connected to a support arm 338 extending from the other side of the support frame extending in the second direction X. These four links 334 through 337 are arranged generally in the form of a rhombus. As the drive shaft 333 is moved toward the support arm 338, the connection between the links 334 and 336 and the connection between the links 335 and 337 move away from each other, and as the drive shaft 333 is moved away from the support arm 338, these connections move toward each other.

A pair of guide shafts 339 are fixedly mounted on each of the opposite sides of the support frame 331 extending in the third direction Z. A guide plate 340 is supported on each pair of guide shafts 339 for sliding movement therealong. The first pair of plugs 34 are fixedly secured to a lower side of one of the guide plates 340, and the second pair of plugs 34 are fixedly secured to a lower side of the other support plate 34. A pair of connecting rod assemblies 341 and 341 extend respectively between the one guide plate 340 and the connection between the links 334 and 336 and between the other guide plate 340 and the connection between the links 335 and 337. Each of the connecting rod assemblies 341 is provided with a screw mechanism so that the connecting rod assembly 341 can be adjusted in its length.

With the construction as described above, as the drive shaft 333 is moved toward the support arm 338, the first pair of plugs 34 mounted on the one support plate 340 and the second pair of plugs 34 mounted on the other support plate 340 move away from each other, that is to say, respectively toward one and other longitudinal ends of the recess 27. It is needless to say, that as the drive shaft 333 is moved away from the support arm 338, the first and second pairs of plugs 34 move in the opposite direction, i.e., toward each other.

Feeding means and clamping means for a thermoplastic sheet material to be formed S (FIG. 5) will next be described. As shown in FIG. 5, a pair of elongated brackets 36 extends vertically between one end of the base plate 22a and corresponding one end of the top plate 22b. A shaft 38 rotated by a motor 37 is rotatably mounted on the brackets 36 at a central portion, in the height direction, of a space between the brackets 36. Drive rolls 39 are fixedly mounted respectively on one and other ends of the shaft 38. Cylinders 40 are mounted respectively on the brackets 36, and pinch rolls 41 connected to the respective cylinders 40 are moved thereby toward and away from the respective drive rolls 39. The pinch rolls 41 cooperate with the respective drive rolls 39 to feed the sheet material S. In the illustrated embodiment, the fed sheet material S is adapted to be manually brought to a position between the female mold 26 and the plugs 34, but, of course, the bringing of the sheet material S to the position can be effected by any suitable mechanical means. As it is detected, based on the numbers of revolutions of the drive rolls 39, that the sheet material S is fed by a predetermined length, the motor 37 is turned off. A guide roll 42 is centrally mounted on the shaft 38, for preventing a longitudinally central portion of the fed sheet material S from handing down.

The clamping means for the sheet material comprises, as shown in FIG. 4, a lower clamping frame 43 fixedly mounted on the posts, not shown, at a mid position between the base plate 22a and the top plate 22b. The lower clamping frame 43 has its upper surface located substantially in flush with contact points between the respective drive rolls 39 and the respective pinch rolls 41. The lower clamping frame 43 has a rectangular frame portion located above the female mold 26. The rectangular frame portion has inside dimensions equal to or larger than the outside dimensions of the female mold 26. Cylinders 44 having their respective axes extending vertically are fixedly mounted respectively to the four corners of the lower clamping frame 43. An upper clamping frame 46 is fixedly connected to upper ends of respective rods 45 extending upwardly from the respective cylinders 44, as shown in FIG. 7, so that the upper clamping frame 46 can move up and down by projection and retraction of the rods 45.

Figure 7:
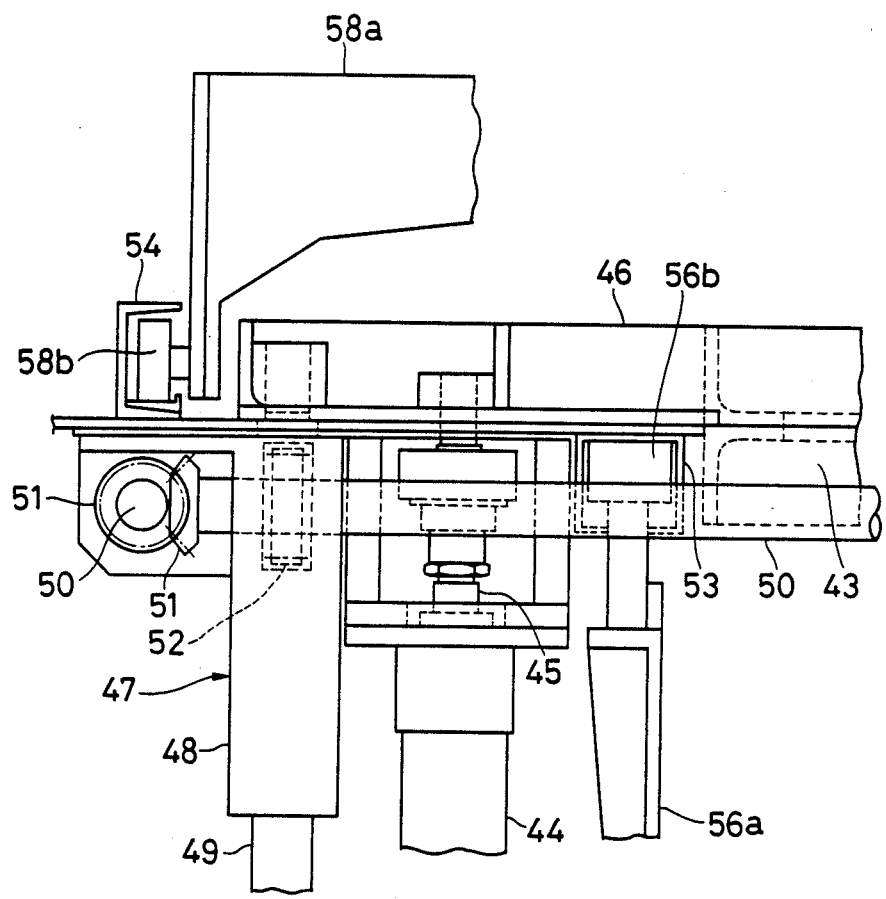
FIG. 7 is an enlarged fragmental view of a portion encircled by VII in FIG. 4.

As shown in FIG. 7, synchronizing means 47 are provided for maintaining the upper clamping frame 46 horizontal during the upward and downward movement thereof. Specifically, guide tubes 48 having their respective axes extending vertically are fixedly secured to the four corners of the lower clamping frame 43. Slidably received respectively in the guide tubes 48 are guide rods 49 having their respective upper ends fixedly secured to the upper clamping frame 46. Each of the guide rods 49 is formed with rack teeth, not shown. Horizontally extending, three shafts 50 are rotatably mounted respectively on and along a front side and opposite ends of the lower clamping frame 43 (one end of the clamping frame 43 being omitted from FIG. 7). These shafts 50 are connected to each other through bevel gears 51. A spur gear 52 is fixedly mounted on each of the shafts 50 and is in mesh with the rack teeth formed on a corresponding one of the guide rods 49. With such arrangement, the upper clamping frame 46 moves vertically while being maintained horizontal, and cooperates with the lower clamping frame 43 to clamp the sheet material therebetween.

As shown in FIG. 5, a horizontally spaced, upper pair of rails 53 (only one shown) and a horizontally spaced, lower pair of rails 54 (only one shown) are arranged at the rear of the apparatus body 22. These rails 53 and 54 extend horizontally to the front side of the apparatus body 22, but portions of the respective rails 53 and 54 located within the apparatus body 22 are not illustrated for simplification. A lower heater 56 is supported by the lower pair of rails 53 through side brackets 56a and rollers 56b which are rotatably mounted respectively to the side brackets 56a and which are received in the lower pair of rails 53, as clearly illustrated in FIG. 7. Thus, the lower heater 56 can travel along the lower pair of rails 53 by a cylinder 55 mounted to the rear of the apparatus body 22. Likewise, an upper heater 58 is mounted on the upper pair of rails 54 through side brackets 58a and rollers 58b rotatably supported respectively on the side brackets 58a and which are received in the upper pair of rails 54, as clearly shown in FIG. 7. Thus, the upper heater 58 can travel along the upper pair of rails 54 by a cylinder 57 mounted to the rear of the apparatus body 22.

A compressed air tank 59 (FIG. 5) is provided which can communicate with the recess 27 through the vacuum guide 28 and a selector valve, not shown, for supplying compressed air to the region between the formed sheet material and the wall surface of the recess 27 to release the formed sheet material from the recess 27, if the release is difficult. A spray mechanism and a fan, both not shown, are arranged on the lower surface of the upper table 32, for spraying cooling water and for blowing cooling air against the formed sheet material to cool the same for a short period of time, to thereby cure the formed sheet material.

The operation of the vacuum forming apparatus constructed as described above, as well as the operation control will now be described. The operation control is effected by means of any suitable limit switches, proximity switches, a numerical control device or the like. However, such control components are well known per se, and the description of the control components will be omitted.

With the sheet material S resting on the drive rolls 39, a start switch, not shown, is turned on to actuate the cylinder 40, so that the pinch rolls 41 move downwardly toward the drive rolls 39 to clamp the sheet material between the rolls 39 and 41. Then, the motor 37 is turned on to rotate the shaft 38 and the drive rolls 39 mounted thereon to feed the sheet material S into the apparatus body 22. As the sheet material S is fed by a predetermined length, the motor 37 is turned off. Under this condition, as another switch is turned on to actuate the cylinder 44 so that the upper clamping frame 46 moves downwardly to clamp and fix the sheet material between the upper and lower clamping frames 46 and 43. Then, the lower and upper heaters 56 and 58 are moved forwardly along the rails 53 and 54 and stop in movement in facing relation to the sheet material S, so that the sheet material S is heated by the heaters 56 and 58 and is softened After the heating of the sheet material S for a predetermined time duration, the heaters 56 and 58 are returned to their respective initial positions Then, the lower table 25 moves upwardly, and the upper table 32 moves downwardly. As the lower end surfaces of the respective plugs 34 are brought into contact with the sheet material and push the same by a predetermined amount or distance while stretching the sheet material, the upper table 32 stops in movement. When the upper table 32 stops in movement, the upper surface of the female mold 26 is brought by the upward movement of the lower table 25 to a position where the upper surface of the female mold 26 is substantially in contact with the sheet material. From this state, the lower table 25 continues to further move upwardly. Simultaneously with the further upward movement of the lower table 25, the first and second pairs of plugs 34 are moved away from each other in the second direction X by the moving mechanism 33. As a result, the first and second pairs of plugs move relatively to the female mold 26 simultaneously in both the first and second directions Y and X, i.e., toward the bottom of the recess 27 and toward the respective one and other longitudinal ends of the recess 27, to stretch the sheet material As the first and second pairs of plugs 34 are substantially brought into contact with the respective one and other longitudinal end wall surfaces of the recess 27 through the sheet material, the lower table 25 stops in movement and the moving mechanism 33 stops in operation. In this state, the upper surface of the female mold 26 is located at a position higher than the initial position of the sheet material. Accordingly, the female mold 26 pushes the sheet material up so that the sheet material is formed also by the upper surface of the female mold 26.

As the upper surface of the female mold 26 is brought into contact with the sheet material to define a substantially closed space by the recess 27 and the sheet material, evacuation is applied to the substantially closed space by the vacuum tank 29. The evacuation continues until a predetermined time period elapses after the sheet material is brought into contact with the wall surface of the recess 27 by the plugs 34. After the elapse of the predetermined time period, the communication between the vacuum tank 29 and the recess 27 is interrupted. Subsequently, the sheet material is cooled by the spray mechanism and the fan so that the sheet material is cured to form a formed product. After the cooling, the upper table 32 moves upwardly. Simultaneously therewith, the first and second pairs of plugs 34 are moved by the moving mechanism 33 toward each other, i.e., away from the respective one and other end wall surfaces of the recess 27. Subsequently, the formed product is removed from the female mold 26, and the lower table 25 moves downwardly. Thus, all of the components are returned to their respective initial positions, and the apparatus stops in operation.

As described above, in the vacuum forming method and apparatus according to the invention, at least one of the female mold and the plug or plugs is moved not only in the first direction in which the plug or plugs and the bottom of the recess relatively move toward each other, but also in the second direction in which the plug or plugs and the peripheral edge of the recess relatively move toward each other. Thus, it is made possible, as compared with the conventional vacuum forming method and apparatus, to largely increase the distance of the portion of the sheet material extending between the position where the sheet material is restrained by the plug or plugs and the position where the sheet material is restrained by the female mold. Consequently, it is possible to prevent the sheet material from being partially or locally thinned excessively. Moreover, even if the wall surface of the recess extends substantially parallel to the first direction, the forming can be effected without any difficulty.

What is claimed is:

1. A vacuum forming apparatus comprising: a female mold having formed therein a recess, said recess being defined by a wall surface having a bottom face and a side wall face section intersected at an angle with said bottom face;

plug means arranged in facing relation to an opening of said recess, said plug means having a face which is substantially parallel to said side wall face section of said recess:

first moving means for moving at least one of said female mold and said plug means in a first direction in which said plug means and said bottom face of said recess relatively move toward each other while the parallel relation being maintained between said face of said plug and said side wall face section of said recess, to cause said plug means to urge a sheet material toward the bottom face of said recess while stretching the sheet material;

second moving means for moving said plug means in a second direction substantially perpendicular to said first direction, in which said plug means moves toward said side wall face section of said recess while the parallel relation being maintained between said face of said plug and said side wall face section, to cause said plug means to urge the sheet material against said side wall face section; and means for evacuating a substantially closed space defined by said recess and the sheet material, to being the sheet material into intimate contact with said wall surface of said recess.

2. A vacuum forming apparatus as defined in claim 1, wherein said first and second moving means are associated with said plug means for moving said plug means in said first and second direction.

3. A vacuum forming apparatus as defined in claim 1, wherein said first moving means is associated with said female mold for moving said female mold in said first direction, and said second moving means is associated with said plug means for moving said plug means in said second direction.

4. A vacuum forming apparatus as defined in claim 1, wherein said first direction is vertical and said second direction is horizontal.

5. A vacuum forming apparatus as defined in claim 1, wherein said plug means comprises a metallic core member and a protective layer formed of soft plastic material, said core member being covered with said protective layer.

6. A vacuum forming apparatus as defined in claim 1, wherein said second moving means is associated with said plug means and said association comprises a drive shaft capable of being reciprocated in a third direction substantially perpendicular to said first and second directions, drive means for driving said drive shaft for movement in said third direction, and linkage means connected between said drive shaft and said plug means for converting the movement of said drive shaft in said third direction to the movement of said plug means in said second direction.

7. A vacuum forming apparatus as defined in claim 6, wherein said plug means comprises first and second plugs, and wherein when said drive shaft is reciprocated by said drive means, said linkage means moving said first and second plugs away from each other so that each of said first and second plugs moves in said second direction.

8. A vacuum forming apparatus as defined in claim 1, said face of said plug means is substantially complementary in configuration to said side wall face section of said recess.

9. A vacuum forming apparatus as defined in claim 1, wherein said second moving means is associated with said plug means, said plug means further comprised of first and second plugs, said association between the second moving means and plug means comprising a drive shaft capable of being reciprocated in a third direction substantially perpendicular to said first and second directions, drive means for driving said drive shaft for movement in said third direction, said drive shaft being reciprocated by said drive means, linkage means connected between said drive shaft and said plug means for converting the movement of said drive shaft in said third direction to the movement of said plug means in said second direction, said linkage means moving said first and second plugs away from each other so that each of said first and second plugs moves in said second direction.

* * * * *